March 2, 1971    B. MOORE    3,566,462
METHOD AND APPARATUS FOR MAKING TOROID TRANSFORMER
Filed Jan. 23, 1969    5 Sheets-Sheet 1

Buell Moore
INVENTOR.

BY
Arnold and Roylance
ATTORNEYS

Buell Moore
INVENTOR

BY
Arnold and Roylance
ATTORNEYS

Fig. 5

Buell Moore
INVENTOR.

BY
Arnold and Roylance
ATTORNEYS

United States Patent Office 3,566,462
Patented Mar. 2, 1971

3,566,462
METHOD AND APPARATUS FOR MAKING TOROID TRANSFORMER
Buell Moore, Houston, Tex., assignor to Esquire, Inc., New York, N.Y.
Continuation-in-part of application Ser. No. 466,406, June 23, 1965, which is a continuation-in-part of application Ser. No. 369,395, May 22, 1964. This application Jan. 23, 1969, Ser. No. 814,218
Int. Cl. H01f 5/00, 7/06; H02k 15/04
U.S. Cl. 29—605                    31 Claims

ABSTRACT OF THE DISCLOSURE

Apparatus and method are provided for making a transformer core of toroid shape. The apparatus includes a template to which performed transformer coils are detachably connected, a plurality of rotatable elongate posts extending through the template and on one side of the template serving to support strip material from which the core is constructed and properly direct such material into the coils, and on the other side having gear teeth for receipt of a ring gear so that the posts may be rotated in unison. An alternate embodiment provides gears mounted in housings, with the housings operable by screws in elongate slots, so that the gears are moved inwardly or outwardly with respect to the center of the template. In another embodiment, rotatable posts are provided which are disposed perpendicular to the core strip, and upon which the core strip rests during winding, in order to prevent slippage of the strip.

CROSS-REFERENCE TO RELATED APPLICATIONS

This application is a continuation-in-part of my copending application entitled "Method and Apparatus for Making Toroid Transformer" filed June 23, 1965, as Ser. No. 466,406, now abandoned which is a continuation-in-part of my application of the same title filed May 22, 1964 as Ser. No. 369,395, now abandoned.

BACKGROUND OF THIS INVENTION

This invention relates to the manufacture of transformers, and more particularly to the manufacture of toroidally-wound transformer assemblies.

Although the most conventionally used power transformers are of a type wherein the coils are wound about a straight length of laminated core material, or possibly an I-shaped core, a transformer having a toroidal core is commonly accepted as being of much greater efficiency. This is because far greater magnetic flux can be carried through the required circuit with a reduction in core iron as compared with transformers of other configurations.

The toroidally-wound transformer has not become the most widely used type probably because of the drawbacks in the known methods of their manufacture.

The most ancient method, and the one still most heavily relied on in a custom installation where the cost of manufacture is not a prime consideration, is the hand winding method. This method first requires the preparation of a laminated core from strip metal wound around a spool to give the desired internal opening. The coil is then laboriously wound about the core, inserting the spool of wire from which the coil (or coils) is made through the center opening on successive convolutions.

Another method used, which is resorted to for mass production quantities, includes preparation of the core in two E-shaped segments. This is done normally in a stamping operation. Coils for each half are then spun on a spinning machine. The core halves are then hand-assembled with the pre-spun coils. Finally, the two core halves are secured to form a continuous toroid configuration.

The primary shortcomings of this method are the acquisition of increased magnetic impedance and the introduction of hot spots caused by eddy currents developing at the junction of the laminated assemblies, thereby partially defeating the ordinary high efficiency resulting from low core loss of a toroid.

Therefore, described herein is a method and apparatus of an illustrated embodiment for preparing a multi-coil, toroid transformer assembly, comprising mounting prewound coil assembiles that are to form the transformer coils juxtaposed so as to allow an annulus equivalent to the final core dimension to be placed within the center openings, thereof, aligning synchronously driven rotatable elongate rollers with respect to said coil assemblies adapted to engage the inside diameter of the transformer core to be formed at points essentially equal to the diameter determined by the inside limits of the openings in said coil assemblies, driving said rollers to wind a laminated transformer core from strip steel, properly insulated, within the openings of said coil assemblies in the form of a toroid, all whereby is formed a cheaply made, reduced-sized, multi-coil transformer of improved operating characteristics.

Also described herein is a method and apparatus essentially equivalent to the above-outlined description for assembling a toroidal coil within a multi-core transformer assembly.

In accordance with the illustrated embodiments of the apparatus shown in the appended drawings, prewound coil assemblies are mounted on a template in a position they will assume in the final transformer assembly. Elongate, annular rods projecting through from the rear of the template are positioned between the coils to determine the inside diameter of the core to be formed, which is approximately the diameter of a circle defined by the limits of the mounted coils.

On the back side of the template, a ring gear having an inside gear-teeth surface for engaging all of the rods is a common drive means for synchronously driving all four rods.

To form a toroid core within the coils, suitable transformer metal strip stock, wound on a reel, is threaded through the coil openings and around the rods, proper alignment being maintained by idler wheels. The rods are driven via the ring gear, which is, in turn, driven by a belt or chain driven connected to the ring gear, so that the strip metal is wrapped into a toroid transformer core.

BRIEF DESCRIPTION OF THE DRAWINGS

More particular description of the invention may be had by reference to the embodiments thereof which are iluustrated in the appended drawings, which form a part of this specification. It is to be noted however, that the appended drawings illustrate only typical embodiments of the invention and therefore are not to be considered limiting of its scope, for the invention will admit to other equally effective embodiments.

DETAILED DESCRIPTION OF PREFERRED EMBODIMENT

Referring now to the drawings in more detail, and particularly to the embodiment of FIGS. 1–4, it will be seen that prewound coils 1, 2, 3 and 4 are positioned on template 13 so that they are spaced evenly about and substantially equidistant from a center point and with their center openings parallel to the template and perpendicular to imaginary lines extending from the center of the template to each of the coils.

Figure 3:
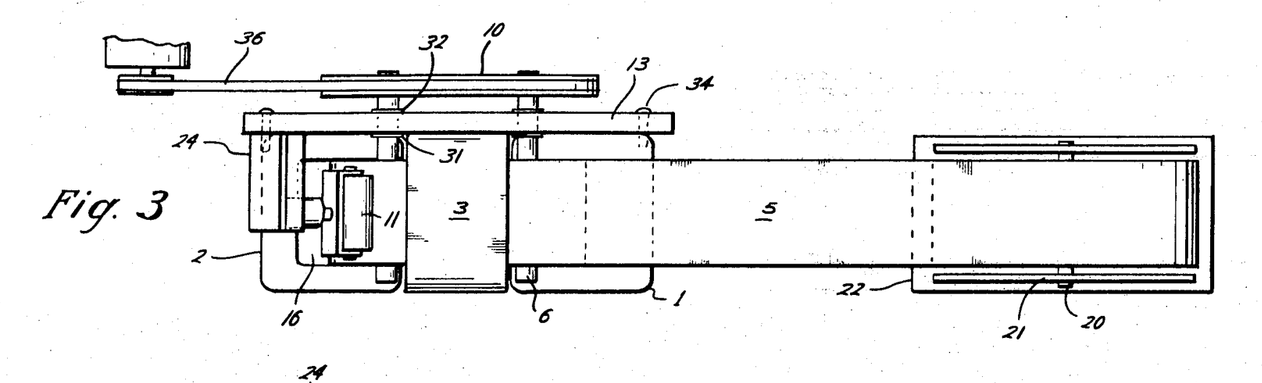
FIG. 3 is a top plan view of the apparatus shown in FIG. 1.
Figure 4:
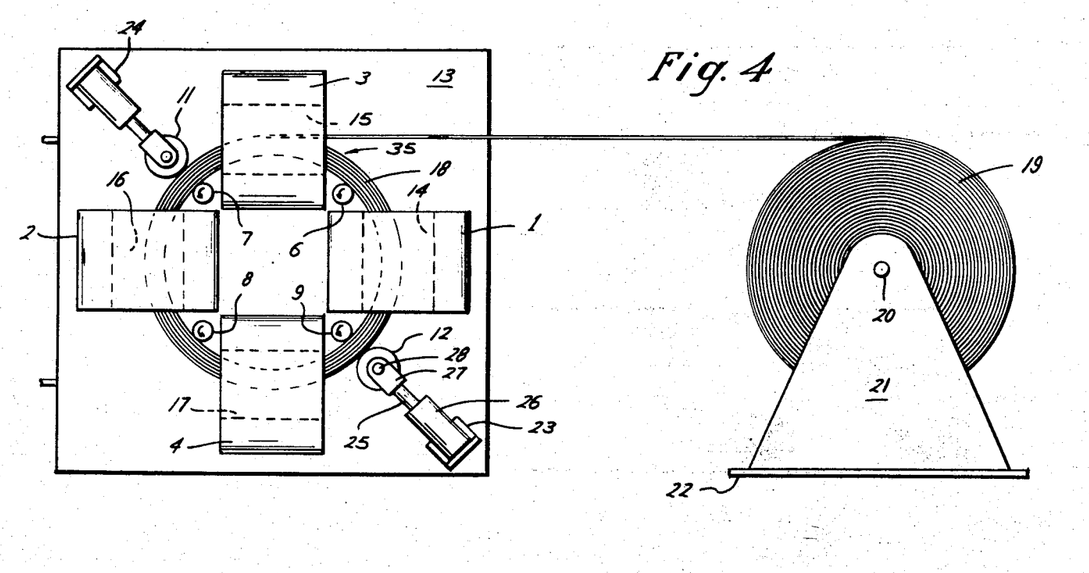
FIG. 4 is a front elevation view of the apparatus shown in FIG. 1.

Coils 1, 2, 3 and 4 used in the transformer assembly are each prewound according to standard practice, being spun on a suitable machine about a removable blank that predetermines the center opening dimension. The opening in each coil must be appropriately large to accomodate the transverse dimension of the completed core. This means, as shown in FIG. 3, that the openings are generally rectangular.

The coils form the primary and secondary windings of the finished transformer, the number of turns being dictated by the purpose served by the transformer. It should be noted that although four coils are illustrated, the method described herein is equally applicable to an assembly having requirements for fewer or greater number of coils.

Figures 1, 2:
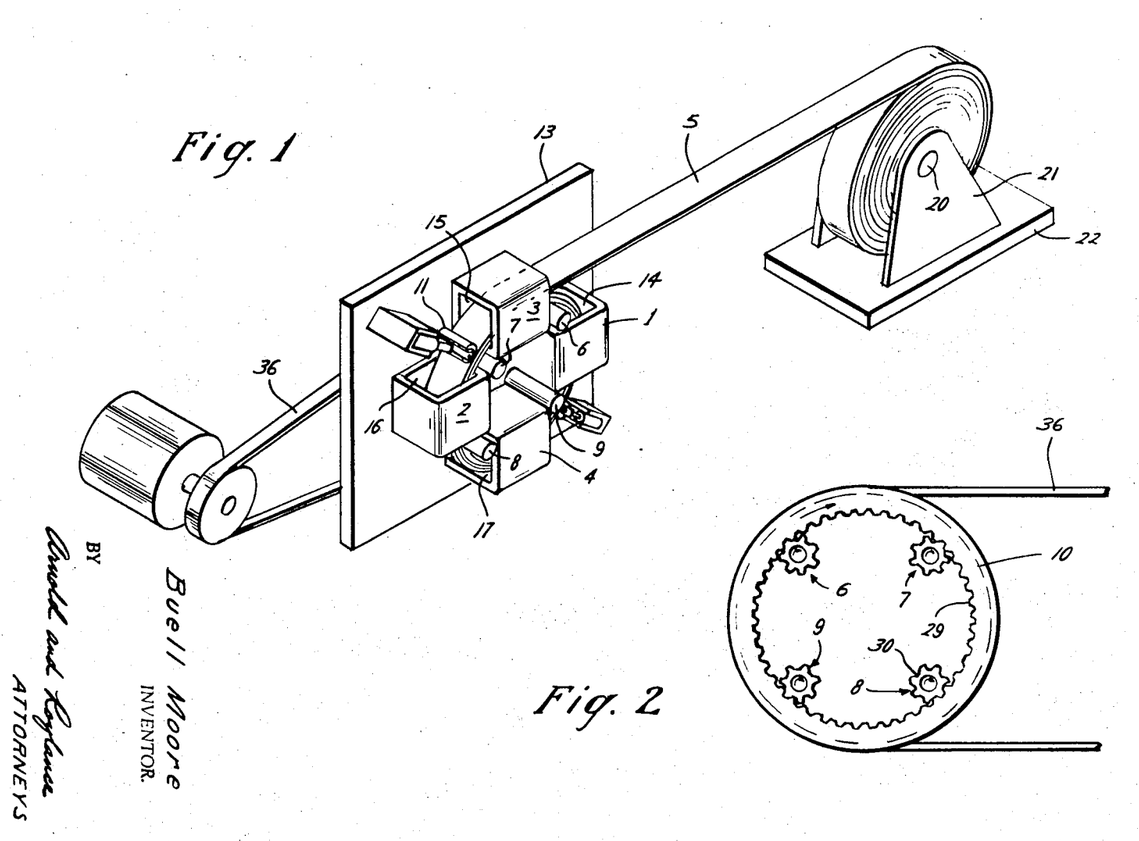
FIG. 1 is an isometric view of an embodiment of the invention being used in the preparation of a toroid transformer.
FIG. 2 is a partial view of the reverse side of part of the apparatus shown in FIG. 1.

The coils are secured to the template via an adhesive substance, by clamps (not shown) attached to the template, or the like, but must, in any event, be readily detachable from the template so that there is no scarring of the insulation or injury to the windings.

Rotatable posts 6, 7, 8 and 9 are inserted from the rear of template 13 between the coils so that they are substantially equidistant from the center about which the coils are mounted. The posts are spaced so as to determine a circle of a diameter equal to the inside diameter of the core to be formed. This is also generally equal to the circle defined by the center-most edges of coil openings 14, 15, 16 and 17.

Each post extends outward from the front surface of template 13 by an amount at least sufficient to provide a complete roller surface for the strip or ribbon of core iron 5 used to make the transformer core. This distance is somewhat beyond the limits of the openings of the coils.

The posts may be secured against transverse movement with respect to template 13 by C-shaped snap rings 31 and 32 placed about the posts on either side of the template. The snap rings allow essentially complete freedom of rotation.

A segment of each post projecting on the rear side of template 13 comprises a surface area with gear teeth 30. As shown in FIG. 2, a ring gear 10, having a center opening with gear teeth 29 located around the inside surface, is placed in surrounding engaging relationship with gear teeth 30 on four posts 6, 7, 8 and 9. A belt or chain drive contacting the outside surface of the ring gear turns the ring gear, and hence the four posts engaged therewith are driven in synchronism.

Located on the front side of the template at positions opposite posts 7 and 9 are idler rollers 11 and 12, attached to template 13 via mounting fixtures 23 and 24, respectively. These rollers are part of spring-urging assemblies biasing ribbon material 5 as it is wound so that successive layers fit snugly one on another without air pockets, wrinkles, or the like. Because they are essentially identical, only roller 12 and its related assembly is discussed below in detail.

Mounting fixture 23 is merely a standoff mounted to template 13 via machine screw 34 screwed through the board and into the fixture.

The surface of the fixture receiving the roller assembly is cup shaped so as to effectively provide a holding surface to resist lateral as well as axial pressure in the direction of movement of piston rod 25.

Housing assembly 26 is held by force fit in fixture 23. Inside the housing assembly and located about the end of poston rod 25 in a spring for biasing the poston rod longitudinally with respect to the housing assembly toward the center about which the core is formed.

Piston 25 is secured to C-shaped wheel mount 27, which, in turn, is attached to wheel 12 via axle 28.

The ribbon of core iron used to form the transformer core is initially stored on a ribbon carrying means such as reel 19 mounted on stand 21. The reel is positioned with respect to the orientation of the plane of template 13 so that the plane of strip core 5 as it is unreeled is in a plane perpendicular to the template.

Stand 21 shown in the drawings comprises a pair of conventional triangular upstanding pieces secured to a base 22, although any equivalent type of reelholding structure could be used. An axle 20 allows the reel to rotate with respect to the stand.

In operation, the end of ribbon 5 is unwound from reel 19 and placed through opening 15 of coil 3. The end is then inserted between post 7 and idler roller 11. Note that if the end of ribbon 5 is released at this point, the urging pressure applied by roller 11 is sufficient to hold the ribbon in place.

The end of the ribbon is then passed through opening 16, over post 8, through opening 17, between post 9 and roller 12, and through opening 14, and over post 6. The end of the ribbon now passes underneath the ribbon when it enters opening 14 as the second turn of the core material is started.

An appropriate cement is applied to the transformer at spot 35, or between the initial layer of the transformer and the subsequent layer just prior to their coming into contact with one another. Alternately, the cement can be applied to the underneath side of ribbon 5 with the same effect.

When the ribbon is threaded about one complete revolution so that the second turn is ready to commence, ring gear 10, on the back of template 13, is driven via the attached drive assembly 36 until a complete laminated wound core 18 is formed. The gear synchronously rotates posts 6, 7, 8 and 9 in the direction shown in FIG. 4.

Figure 5:
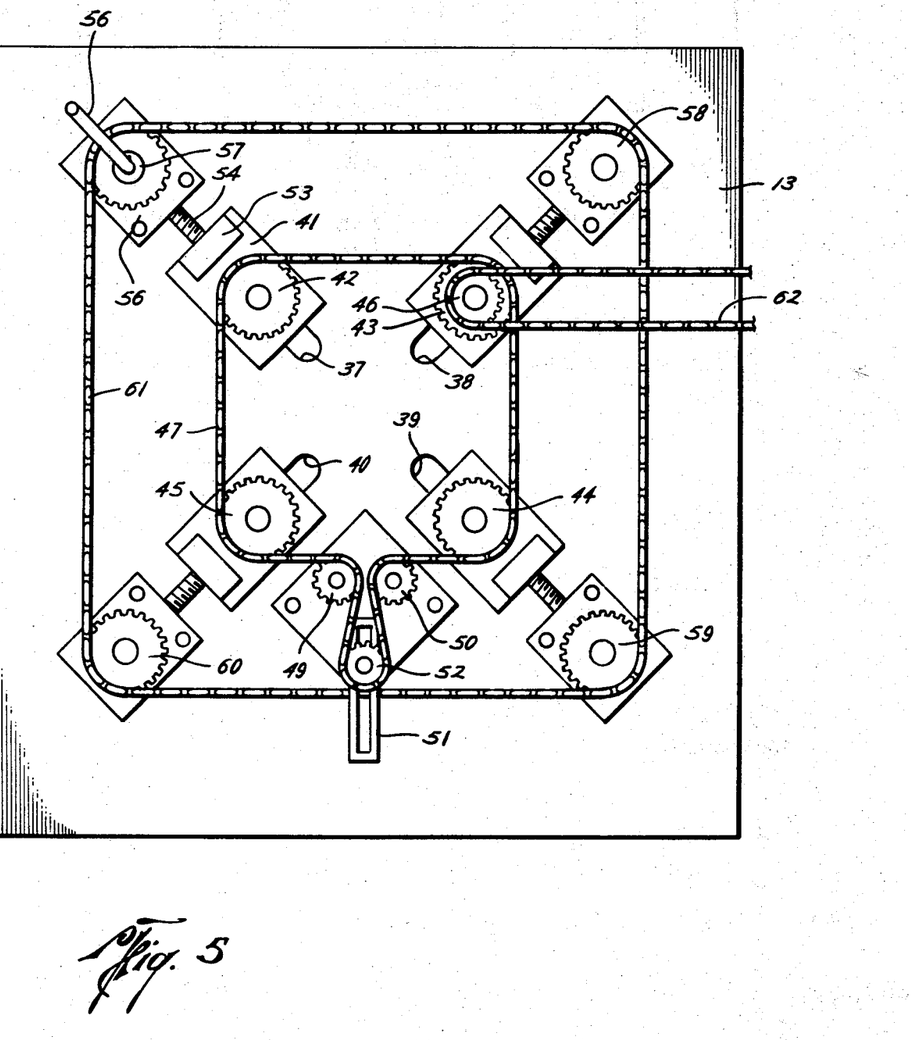
FIG. 5 is a partial rear elevation view of an alternate embodiment of the invention.

THE EMBODIMENT OF FIG. 5

An alternate embodiment of apparatus utilizing the invention is shown in FIG. 5. The elongate posts extend through elongate openings 37, 38, 39 and 40 in template 13, the openings being elongate in a radial direction from the center of the template. Such openings allow the posts to be moved such that a circle including all posts is made larger or smaller when the posts are moved uniformly radially outwardly or inwardly with respect to the center.

On the end of each post on the rear side of the template is a housing 41 to maintain the post within the confines of the respective opening so as to rotate freely. The opening may hold and guide the housing in a typical channel arrangement. C-shaped snap rings, such as those described in the description of FIG. 3, may be used to mount the posts within their respective housings. Gears 42, 43, 44 and 45 are respectively concentrically mounted on each post on the exposed side of their respective housings. At least one post has a second concentric gear 46 so mounted.

A drive means, such as a continuous link chain 47 suitable for mating with the teeth of gears 42, 43, 44 and 45, may be placed around these gears. In order to keep chain 47 taut, an assembly including an idler gear may be used. Such an assembly is shown in the lower part of FIG. 5 and comprises a stationary mounting block 48, two stationary gears 47 and 50 mounted thereon, a channel 51 and an idler gear 52.

Chain 47 is placed inside gears 49 and 50 and around idler gear 52. Gear 52 is adjustably positioned within channel 51 fixedly secured to block 48 so as to be free to rotate. When the circumference of the circle defined by gears 42, 43, 44 and 45 is changed, gear 52 may be loosened within channel 51, moved to its new position so as to keep the chain taut, and retightened within the channel.

The chain from gears 49 and 50 arrives at gear 52 virtually parallel, making the placement of gear 52 very position sensitive. That is, a small movement of gear 52 toward the center of the circle defined by gears 42, 43, 44 and 45 without any movement of these gears, would cause chain 47 to become quite slack.

Each of housings 41 has an integral block 53 at its radially outward edge for receiving a lead screw 54 fixedly secured thereto. Lead screw 54 at its other end is surrounded by stationarily mounted gear housing 55, which may comprise a very simple worm-gear-bevel-gear arrangement connected to a frusto-conical shaped pinion gear.

When the pinion gear is turned, the other gears cause lead screw 54 to exert pressure against block 53, thereby moving housing 41 and post 42 in accordance with the radial direction of the elongate opening. The turning of the pinion gear in one direction causes the post to move in and the turning of the pinion gear in the other direction causes the post to move out.

The shaft to which the pinion gear is connected may be driven manually via handle 56 attached thereto.

Also, attached to this shaft is a gear 57. In like manner, shafts at similar gear housings at the other post positions have gears 58, 59 and 60 connected thereto. A continous chain 61 is matingly looped around all of these gears to combine them into a synchronously operating position setting means.

When handle 56 is turned, each of the lead screws are sychronously turned together through lead screw drive chain 61. Since the respective gear housings are all stationary, the post assemblies are moved uniformly within their respective elongate template openings.

When the posts are adjusted to a new position they are set so that side pressure on the posts will not move them transversely with respect to the core to be formed around them on the front side of template 13. Therefore, the posts provide an effective size and shape determining guide for the core.

A master drive chain 62 around gear 46 may be used to rotate the posts during the core winding process. Drive chain 47 around gears 42, 43, 44 and 45 ensures that the posts are driven in synchronism.

Figure 6:
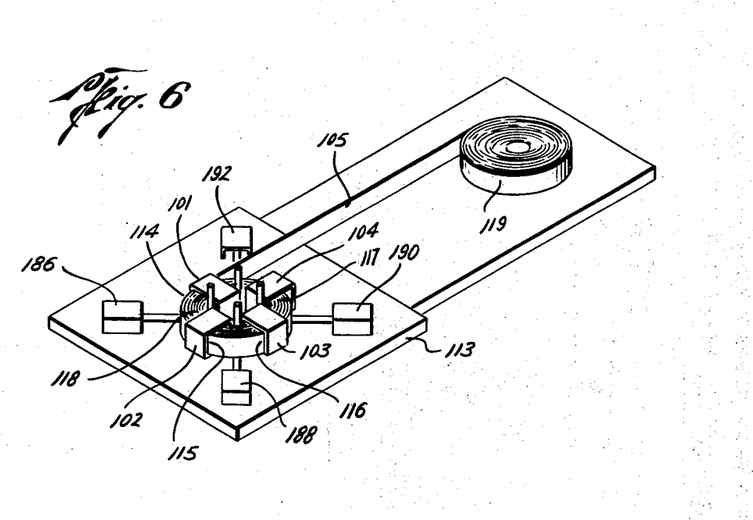
FIG. 6 is a pictorial view of yet another embodiment of the invention.
Figure 7:
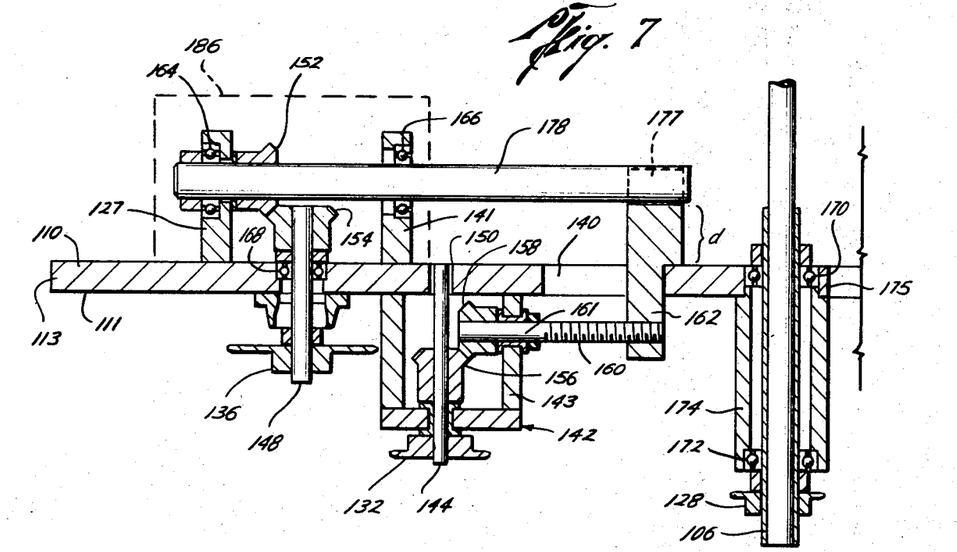
FIG. 7 is a front sectional elevation view of a portion of the apparatus shown in FIG. 6.
Figure 8:
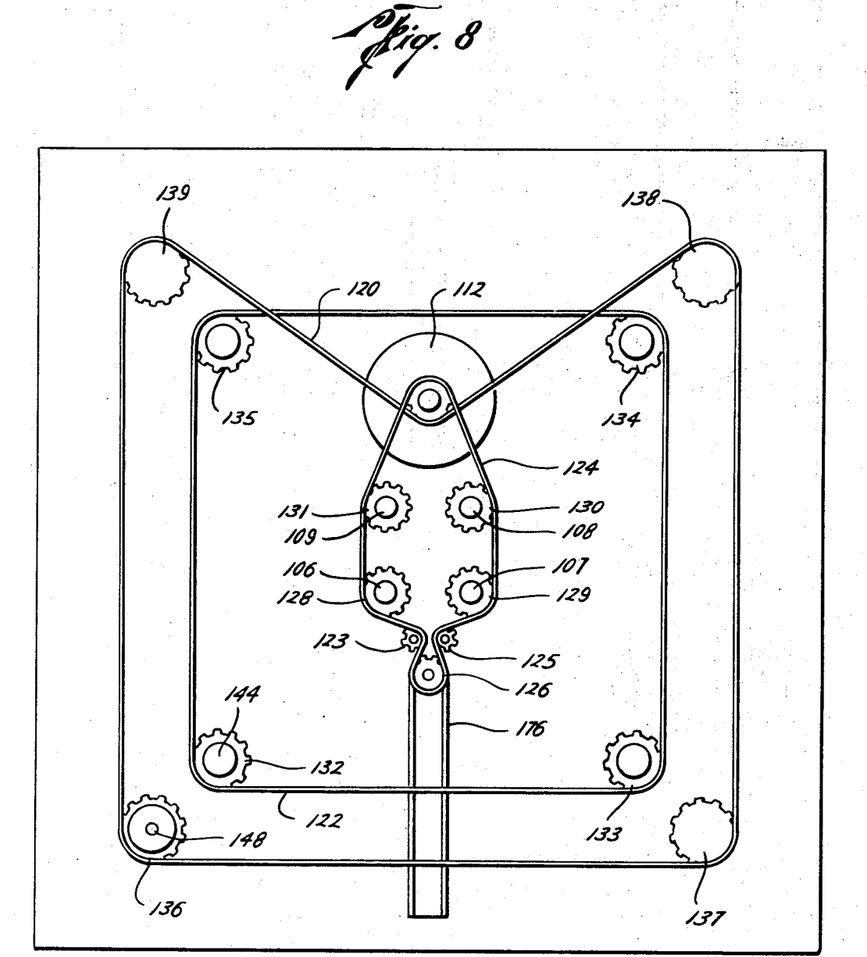
FIG. 8 is a bottom view of the apparatus shown in FIG. 6.

THE EMBODIMENT OF FIGS. 6–8

In FIGS. 6–8 is shown another embodiment of the invention which is much like the FIG. 5 embodiment.

Referring first to FIG. 6, preformed coils 101, 102, 103, and 104 are shown adhered in a manner such as that previously described to a first surface 110 of mounting plate or tempelate 113. A strip or ribbon 105 of material suitable for forming a transformer core is drawn through the openings 114, 115, 116 and 117 formed by the preformed coils, and around the posts 106, 107, 108 and 109 which extend above the surface 110 of the template 113. The upstanding posts 106, 107, 108 and 109 are desirably positioned on the template 113 in the same configuration as above described in connection with the embodiments of FIGS. 1–4 and 5.

Disposed approximately equidistantly between adjacent ones of the preformed coils are rotatable rods 178, 180, 182 and 184, these rods being disposed in a plane generally parallel to the template 113. Each of these rods is disposed fairly close to the surface of the template, so that the underside of core 118 will rest on one end of each of these rotatable rods as the core is wound. The opposite end of each of the rotatable rods extends radially outwardly from the center of the core 118 and is desirably located in a housing 186, 188, 190 and 192.

As in the embodiment of FIGS. 1–4, the strip or ribbon of core material 105 is desirably withdrawn from a reel 119 located on or adjacent to the template 113.

Means are located adjacent the opposite surface 111 of template 113 for rotating the rotatable rods 178, 180, 182 and 184. Means are also included for rotating the upstanding posts 106, 107, 108 and 109 inwardly or outwardly with respect to the center of the core 118 in the same general manner as described above in connection with the FIG. 5 embodiment.

The means for rotating the rod 178 desirably comprises bevel gear 152 disposed concentrically about the rod 178, cooperating with the bevel gear 154 disposed about a transverse shaft 148. The shaft 148 is driven by an associated gear 136 which has teeth in the outer surface thereof with which a chain 120 is adapted to mate.

Suitable bearing members such as the bearings 164 and 168 are disposed between the bevel gears and the support 127 and template 113, respectively, so that the gear assembly may be supported by these members and yet turn freely therein.

In similar manner, the rods 180, 182, and 184 are driven by chain 120 through the gears 37, 38, and 39, respectively.

The means for rotating the upstanding posts 106, 107, 108 and 109 are desirably similar to that described above in connection with the embodiment of FIG. 5. As seen in FIGS. 7 and 8, the post 106 extends through an aperture 175 in template 113. The post 106 extends above the surface 110 of template 113 a distance which is considerably greater than the distance "d" between the lower surface of the rod 178, and the surface 110 of template 113. In this manner, the surface of the post 106 is adapted to move against the surface of the strip or ribbon 105 and facilitate the turning of the ribbon to form the core 118, while the lower edge of the strip 105 rests on the top of the rod 178 and similar rods 180, 182 and 184.

The post 106 is desirably supported in a housing 174 which is fixedly attached to the template 113. The post 106 is free to rotate with respect to the template and housing 174 by means of the bearings 170 and 172.

Operably associated with the post 106 is a gear 128 which has teeth to receive the chain 124, the turning of the chain operating to turn the post 106.

The posts 107, 108, and 109 are similarly driven by the chain 124 through the gears 129, 130, and 131, respectively.

In the same general manner as discussed above in connection with the FIG. 5 embodiment, the chain 124 (Refer to FIG. 8) is desirably drawn around an adjustable idler gear 126 and associated gears 123 and 125. The chain 124 is placed around each of the gears 128, 129, 130 and 131, inside the gears 123 and 125, and around the idler gear 126. Idler gear 126 is adjustably positioned within the channel 176 in a manner such that the idler gear is free to rotate. When the circumference of the circle defined by the gears 128, 129, 130 and 131 is changed, idler gear 126 may be loosened in the channel 176 and moved to a new position in the channel so as to keep the chain taught at all times.

Chains 120 and 124 are desirably driven by a common driving means, such as a variable speed drive motor 112.

Also as in the embodiment illustrated in FIG. 5, means are included in the FIGS. 6–8 embodiment for moving the posts 106, 107, 108 and 109 inwardly and outwardly with respect to the center of the core 118.

In connection with the post 106 there is a slot 140 in template 113, and the post 106 and its associated housing 174 is adapted to move back and forth with respect to the center of the core 118, in this slot 140.

Disposed in a housing 142 and extending through an aperture 150 in template 113, is a shaft 144, near the opposite template 113 of which is associated a gear 132. The shaft 144 rotates in the aperture 150 and is supported by the template 113, and has a suitable bushing or the like around the exterior thereof adjacent the aperture in the template. Disposed about the shaft 144 on the side of housing 142 opposite the gear 132 is a bevel gear 156 which operably drives the bevel gear 158 and its operably associated transverse shaft 161. The shaft 161 includes, at its end opposite the bevel gear 158, a worm gear or threaded portion 160 which operates to drive the block 162, the block 162 being operably connected to the post 106 and its housing 174. Rod 178 is free to move with respect to the block 162 in a U-shaped clamp 177 on the block 162 which fits around the outer surface of the rod 178.

Upstanding projections 141 and 143 of housing 142 are fixedly attached to the template 113, and the projection 141 serves as additional support for the rod 178, bearing 166 allowing rotation of the rod 178 with respect to the projection 141.

The gear 132 is rotated by mating chain 122, which in turn drives the gears 133, 134 and 135 in like manner, thereby serving as means for adjustment of upstanding posts 107, 108 and 109.

The embodiment of FIGS. 6-8 has been found to provide better insurance against slippage of the core material as the core is being wound, and therefore a more tightly wound core is achieved.

The completed toroidally-wound assembly has several distinct advantages structurally over those wound by prior art methods. First, since the coils are prewound, they can be so wound with machine precision not possible in hand-wound transformers. Therefore, not only are turn ratios precisely maintained, but wire lengths (and the resultant resistances) are kept proportional.

It is even possible to more uniformly wind the individual coils themselves in the configuration described herein than before. This is because each coil is symmetrical, not having to conform to the core, so that at the outer edge a turn is no longer than a turn in the middle.

Also, since the coils are not wound about the core, but the core about the coils, the core may be made circular, establishing a flux pattern effecting minimum power loss and maximum efficiency.

Moreover, by forming a round core, rather than a rectangular one, maximum saving in core iron is realized.

Finally, there is no need for a removable spool or sleeve, such as in Granfield 2,219,182, for winding the laminated core. The posts and the inside surface of the coil openings automatically provide the guide for the strip material.

As is readily apparent, apparatus similar to the embodiment illustrated in the drawings and described above could be made from the teachings of this patent and by applying ordinary skill could be applied to the making of a multi-core transformer, such as shown in FIG. 2 of Steinmayer et al. 2,305,999.

While only certain preferred embodiments of the invention have been described in this specification, it is obvious that various substitutes of structure may be made without varying from the scope of the invention.

What is claimed is:

1. Apparatus for manufacturing a toroid core in a multi-coil transformer assembly, comprising
   a mounting plate having a front side and a rear side,
   means for mounting a plurality of prewound transformer coils on the front side of said plate in desired final position with respect to one another, each of said coils having an internal opening adapted to receive the cross sectional dimension of the transformer core,
   a plurality of rotatable elongate posts mounted through said plate so as to be free to rotate but substantially fixed against transverse movement with respect to said plate,
      said posts being positioned with respect to said coils on the front side of said plate to determine the shape and size of the core opening,
   means engaging said posts on said rear side of said plate for driving said posts in synchronism, and
   ribbon carrying means carrying ribbon core material for forming the core by being threaded through said openings in said coils and about said posts.

2. An apparatus for manufacturing a toroid core in accordance with claim 1, and including means for urging successive layers of said ribbon material against one another for minimizing air pockets, wrinkles and the like in the core.

3. An apparatus for manufacturing a toroid core in accordance with claim 2, wherein said means is a plurality of idler rollers urged against the outside of the forming toroid core for pressing successive layers together.

4. An apparatus for manufacturing a toroid core in a multi-coil, transformer assembly, comprising
   a mounting plate having a front side and a rear side,
   means for mounting a plurality of prewound transformer coils on the front side of said plate in desired final position with respect to one another to essentially define an annulus, each of said coils having an internal opening adapted to receive the cross sectional dimension of the transformer core,
   a plurality of rotatable elongate posts mounted through said plate so as to be free to rotate but substantially fixed against transverse movement with respect to said plate,
      said posts being positioned between said coils on the front side of said plate to determine the annular shape and size of the core opening in agreement with the openings of said coils,
   means engaging said posts on said rear side of said plate for driving said posts in synchronism,
   a reel assembly carrying ribbon core material for forming the core by being threaded through said openings in said coils and about said posts, and
   means for urging successive layers of said ribbon material against one another for minimizing air pockets, wrinkles, and the like in the core.

5. An apparatus for manufacturing a toroid core in accordance with claim 4, wherein
   each of said posts has gear teeth formed in its surface on part of that portion projecting from the rear side of said plate, and
   said engaging means is a ring-drive mechanism having gear teeth for mating with said plurality of posts for driving said posts in synchronism.

6. An apparatus for manufacturing a toroidally-wound first ring assembly inside a plurality of second ring assemblies, comprising
   a mounting plate having a front side and a rear side,
   means for mounting a plurality of the second ring assemblies on the front side of said plate in final position with respect to one another, each of said second ring assemblies having an internal opening adapted to receive the cross sectional dimension of the first ring assembly,
   a plurality of rotatable elongate posts mounted through said plate so as to be free to rotate but substantially fixed against transverse movement with respect to said plate,
      said posts being positioned with respect to said second ring assemblies on the front side of said plate to determine the shape and size of the opening in said first ring assembly,
   means engaging said posts on said rear side of said plate for driving said posts in synchronism, and a reel assembly carrying strip material for forming said first ring assembly by being threaded through said openings in said second ring assemblies and about said posts.

7. An apparatus for manufacturing a toroidally-wound first ring assembly inside a plurality of second ring assemblies, comprising
a mounting plate having a front side and a rear side,
means for mounting a plurality of the second ring assemblies on the front side of said plate in final position with respect to one another to essentially define an annulus, each of said second ring assemblies having an internal opening adapted to receive the cross sectional dimension of the first ring assembly,
a plurality of rotatable elongate posts mounted through said plate so as to be free to rotate but substantially fixed against transverse movement with respect to said plate,
said posts being positioned between said second ring assemblies on the front side of said plate to determine the annular shape and size of the first ring assembly opening in agreement with the openings of said second ring assemblies,
means engaging said posts on said rear side of said plate for driving said posts in synchronism,
a reel assembly carrying strip material for forming said first ring assembly by being threaded through said openings in said second ring assemblies and about said posts, and
means for pressing succesive layers of said strip material together.

8. An apparatus for manufacturing a toroidally-wound first ring assembly in accordane with claim 7, wherein
each of said posts has gear teeth formed in its surface on part of that portion projecting from the rear side of said plate, and
said engaging means in a ring-drive mechanism having gear teeth for mating with said plurality of posts for driving said posts in synchronism.

9. An apparatus for manufacturing a toroid core in a multi-coil, transformer assembly, comprising
a mounting plate having a front side and a rear side,
means for mounting a plurality of prewound transformer coils on the front side of said plate in final position with respect to one another, each of said coils having an internal opening adapted to receive the cross sectional dimension of the transformer core,
a plurality of rotatable elongate posts transversely adjustably mounted through said plate at a substantially fixed transverse position with respect to said plate so as to be free to rotate,
said posts being positioned with respect to said coils on the front side of said plate to determine the shape and size of the core opening,
means engaging said posts on said rear side of said plate for driving said posts in synchronism, and
ribbon carrying means carrying ribbon core material for forming the core by being threaded through said openings in said coils and about said posts.

10. An apparatus for manufacturing a toroid core in a multi-coil, transformer assembly, comprising
a mounting plate having a front side and a rear side,
means for mounting a plurality of prewound transformer coils on the front side of said plate in final position with respect to one another defining an annulus, each of said coils having an internal opening adapted to receive the cross sectional dimension of the transformer core,
a plurality of rotatable elongate posts transversely adjustably mounted through said plate at a substantially fixed transverse position with respect to said plate so as to be free to rotate,
said posts being positioned between said coils on the front side of said plate to determine the annular shape and size of the core opening in agreement with the openings of said coils,
means engaging said posts on said rear side of said plate for driving said posts in synchronism,
a reel assembly carrying ribbon core material for forming the core by being threaded through said openings in said coils and about said posts, and
means for urging successive layers of said ribbon material against one another for minimizing air pockets, wrinkles, and the like in the core.

11. An apparatus for manufacturing a toroid core in accordance with claim 10, wherein
each of said posts has gear teeth formed in its surface on part of that portion projecting from the rear side of said plate, and
said engaging means is a ring-drive mechanism having gear teeth for mating with said plurality of posts for driving said posts in synchronism.

12. An apparatus for manufacturing a toroidally-wound first ring asembly inside a plurality of second ring assemblies, comprising
a mounting plate having a front side and a rear side,
means for mounting a plurality of the second ring assemblies on the front side of said plate in final position with respect to one another, each of said second ring assemblies having an internal opening adapted to receive the cross sectional dimension of the first ring assembly,
a plurality of rotatable elongate posts transversely adjustably mounted through said plate at a substantially fixed transverse position with respect to said plate so as to be free to rotate,
said posts being positioned with respect to said second ring assemblies on the front side of said plate to determine the shape and size of the opening in said first ring assembly,
means engaging said posts on said rear side of said plate for driving said posts in synchronism, and
a reel assembly carrying strip material for forming said first ring assembly by being threaded through said openings in said second ring assemblies and about said posts.

13. An apparatus for manufacturing a toroidally-wound first ring assembly inside a plurality of second ring assemblies, comprising
a mounting plate having a front side and a rear side,
means for mounting a plurality of the second ring assemblies on the front side of said plate in final position with respect to one another to essentially define a circle, each of said second ring assemblies having an internal opening adapted to receive the cross sectional dimension of the first ring assembly,
a plurality of rotatable elongate posts transversely adjustably mounted through said plate at a substantially fixed transverse position with respect to said plate so as to be free to rotate,
said posts being positioned between said second ring assemblies on the front side of said plate to determine the circular shape and size of the first ring assembly opening in agreement with the openings of said second ring assemblies,
means engaging said posts on said rear side of said plate for driving said posts in synchronism,
a reel assembly carrying strip material for forming said first ring assembly by being threaded through said openings in said second ring assemblies and about said posts, and
means for pressing successive layers of said strip material together.

14. An apparatus for manufacturing a toroidally-wound first ring assembly in accordance with claim 13, wherein
each of said posts has gear teeth formed in its surface on part of that portion projecting from the rear side of said plate, and said engaging means in a ring-drive mechanism having gear teeth for mating with said plurality of posts for driving said posts in synchronism.

15. An apparatus for manufacturing a toroid core in a multi-coil transformer assembly, comprising
a mounting plate having a front side and a rear side,
means for mounting a plurality of prewound transformer coils on the front side of said plate in final position with respect to one another, each of said coils having an internal opening adapted to receive the cross sectional dimension of the transformer core,
a plurality of rotatable elongate posts mounted through elongate openings in said plate so as to be free to rotate,
said posts being positioned with respect to said coils on the front side of said plate to determine the shape and size of the core opening,
drive means engaging said posts on said rear side of said plate for driving said posts in synchronism,
a plurality of lead screws means connected respectively to said posts for adjusting said posts,
position setting means engaging said lead screw means for setting said adjustment means by moving said posts in unison about the center of said core opening, and
a reel assembly carrying ribbon core material for forming the core by being threaded through said openings in said coils and about said posts.

16. An apparatus in accordance with claim 15, wherein said position setting means turns said lead screw means so as to synchronously radially move said posts uniformly with respect to the center of said core opening.

17. An apparatus for manufacturing a toroid transformer core in a multi-coil transformer assembly, comprising
a mounting plate having a front side and a rear side,
means for mounting a plurality of prewound transformer coils on the front side of said plate in final position with respect to one another, each of said coils having an internal opening adapted to receive the cross sectional dimension of the transformer core,
a plurality of rotatable elongate posts mounted through elongate openings in said plate so as to be free to rotate,
said posts being positioned with respect to said coils on the front side of said plate to determine the shape and size of the core opening,
drive means engaging said posts on said rear side of said plate for driving said posts in synchronism,
adjustment means operably connected to said posts and operable to move said posts in said elongate openings to allow for transverse expansion and contraction positioning of said posts, and
a reel assembly carrying ribbon core material for forming the core by being threaded through said openings in said coils and about said posts.

18. An apparatus in accordance with claim 17, wherein said drive means drives said adjustment means in synchronism for moving said posts radially uniformly with respect to the center of said core opening.

19. An apparatus for manufacturing a toroidally-wound first ring assembly inside a plurality of second ring assemblies, comprising
a mounting plate having front side and a rear side,
means for mounting a plurality of the second ring assemblies on the front side of said plate in final position with respect to one another, each of said second ring assemblies having an internal opening adapted to receive the cross sectional dimension of the first ring assembly,
a plurality of rotatable elongate posts mounted through elongate openings in said plate so as to be free to rotate,
said posts being positioned with respect to said second ring assemblies on the front side of said plate to determine the shape and size of the opening in said first ring assembly,
drive means engaging posts on said rear side of said plate for driving said posts in synchronism,
a plurality of lead screw means connected respectively to said posts for adjusting said posts,
position setting means engaging said lead screw means for setting said adjustment means by moving said posts in unison about the center of said opening in said first ring assembly, and
a reel assembly carrying ribbon core material for forming said first ring assembly by being threaded through said openings in said second ring assemblies and about said posts.

20. An apparatus in accordance with claim 19, wherein said position setting means turns said lead screw means so as to synchronously radially move said posts uniformly with respect to the center of said opening in said first ring assembly.

21. Apparatus in accordance with claim 10, wherein said means for urging successive layers of said ribbon material against one another, comprises rotatable elongate rods disposed on the front side of said mounting plate and generally parallel thereto, said rods fitting beneath said core as the core is wound, and means for rotating said elongate rods.

22. Apparatus in accordance with claim 13, wherein said means for urging successive layers of said ribbon material against one another, comprises rotatable elongate rods disposed on the front side of said mounting plate and generally parallel thereto, said rods fitting beneath said core as the core is wound, and means for rotating said elongate rods.

23. Apparatus in accordance with claim 17, said apparatus additionally including:
rotatable elongate rods disposed on said front side of said mounting plate and generally parallel thereto, said rods being positioned such that the underside of said core rests on said rods as the core is being formed, and,
means for rotating said elongate rods.

24. Apparatus in accordance with claim 19, said apparatus additionally including:
rotatable elongate rods disposed on said front side of said mounting plate and generally parallel thereto, said rods being positioned such that the underside of said core rests on said rods as the core is being formed, and,
means for rotating said elongate rods.

25. Apparatus for manufacturing a toroid core in a multi-coil transformer assembly, comprising:
a mounting plate having a first side and a second side;
means for mounting a plurality of prewound transformer coils on the first side of said plate in desired final position with respect to one another, each of said coils having an internal opening adapted to receive the cross sectional dimension of the transformer core;
a plurality of rotatable elongate posts mounted through said plate and disposed substantially perpendicular thereto,
said posts being mounted through elongate openings in said mounting plate, in a manner such that said posts are free to rotate about their longitudinal axes, and
said posts being positioned with respect to said coils on the first side of said plate to determine the shape and size of the core opening;
means connected to said mounting plate for rotating said posts;
adjustment means operably connected to said posts and operable to move said posts in said elongate openings, to allow for transverse expansion and contraction positioning of said posts;

rotatable elongate rods disposed on the first side of said mounting plate and generally parallel thereto, said rods being positioned such that the underside of said core rests on said rods as the core si being formed;

means for rotating said elongate rods; and, a reel assembly carrying ribbon core material for forming the core by threading through said openings in said coils and about said posts.

26. The method of manufacturing a toroid core in a multi-coil, transformer assembly, comprising the steps of aligning a plurality of transformer coils with respect to one another so that their openings are adapted to accommodate the core within their confines, directing a ribbon of suitable material for forming a transformer core over rotatable posts positioned to determine the size and shape of the core opening inside of said coils, cementing successive layers of the ribbon material together so as to form a laminated core structure, and driving said rotatable posts in synchronism to wrap said ribbon material into a toroid transformer core inside said coils.

27. The method of manufacturing a toroid core in accordance with claim 26, including the additional step of biasing the successive layers of said ribbon material together so as to minimize air pockets, wrinkles, and the like.

28. The method of manufacturing a toroidally-wound first ring assembly inside a plurality of second ring assemblies, comprising the steps of aligning a plurality of second ring assemblies with respect to one another so that their openings are adapted to accommodate the first ring assembly within their confines, directing a strip material for forming said first ring assembly over a rotatable post positioned to determine the size and shape of the first ring opening inside of said second ring assemblies, driving said rotatable posts in synchronism to wrap said strip material into a toroid ring assembly inside said second ring assemblies, and biasing the successive layers of said strip material together.

29. The method of manufacturing a toroid core in a multi-coil, transformer assembly, comprising the steps of aligning a plurality of transformer coils with respect to one another so that their openings are adapted to accommodate the core within their confines, positioning rotatable posts to determine the size and shape of the inside core opening of said coils, directing a ribbon of suitable material for forming a transformer core over said rotatable posts, cementing successive layers of the ribbon material together so as to form a laminated core structure, and driving said rotatable posts in synchronism to wrap said ribbon material into a toroid transformer core inside said coils.

30. The method of manufacturing a toroid core in accordance with claim 29, including the additional step of biasing the successive layers of said ribbon material together so as to minimize air pockets, wrinkles, and the like.

31. The method of manufacturing a toroidally-wound first ring assembly inside a plurality of second ring assemblies, comprising the steps of aligning a plurality of second ring assemblies with respect to one another so that their openings are adapted to accommodate the first ring assembly within their confines, positioning rotatable posts to determine the size and shape of the inside core opening of said coils, directing a strip material for forming said first ring assembly over said rotatable posts, driving said rotatable posts in synchronism to wrap said strip material into a toroid ring assembly inside said second ring assemblies, and biasing the successive layers of said strip material together.

References Cited
UNITED STATES PATENTS

| | | | |
|---|---|---|---|
| 3,462,831 | 8/1969 | Whiteman | 29—605 |
| 3,474,529 | 10/1969 | Lightner et al. | 29—203X |

THOMAS H. EAGER, Primary Examiner

U.S. Cl. X.R.

29—203; 156—192